United States Patent
Blewett et al.

(10) Patent No.: US 11,021,982 B2
(45) Date of Patent: Jun. 1, 2021

(54) SHAFT FACE SEAL

(71) Applicant: HAMILTON SUNDSTRAND CORPORATION, Charlotte, NC (US)

(72) Inventors: Michael R. Blewett, Stillman Valley, IL (US); Yiwei Jiang, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 201 days.

(21) Appl. No.: 16/145,524

(22) Filed: Sep. 28, 2018

(65) Prior Publication Data

US 2020/0103033 A1 Apr. 2, 2020

(51) Int. Cl.
| | |
|---|---|
| *F01D 11/00* | (2006.01) |
| *F16J 15/34* | (2006.01) |
| *F02C 7/28* | (2006.01) |
| *F01D 25/18* | (2006.01) |

(52) U.S. Cl.
CPC .......... *F01D 11/003* (2013.01); *F16J 15/348* (2013.01); *F16J 15/3464* (2013.01); *F16J 15/3484* (2013.01); *F01D 25/183* (2013.01); *F02C 7/28* (2013.01); *F05D 2240/55* (2013.01); *F05D 2260/98* (2013.01)

(58) Field of Classification Search
CPC .... F16J 15/3464; F16J 15/348; F16J 15/3484; F01D 11/02; F01D 11/025; F01D 11/08; F05D 2240/55; F05D 2240/56; F02C 7/28
USPC ........................................................ 277/397
See application file for complete search history.

(56) References Cited

U.S. PATENT DOCUMENTS

| | | | | |
|---|---|---|---|---|
| 2,375,985 A | * | 5/1945 | Freeman | F16J 15/38 277/397 |
| 2,650,841 A | * | 9/1953 | Meyer | F16J 15/36 277/373 |
| 2,806,720 A | * | 9/1957 | Meyer | F16J 15/36 277/392 |
| 3,026,114 A | | 3/1962 | Andresen et al. | |
| 3,042,414 A | * | 7/1962 | Tracy | F16J 15/38 277/370 |
| 3,889,960 A | * | 6/1975 | Wiese | F04D 29/588 277/397 |
| 4,688,807 A | * | 8/1987 | Warner | F16J 15/348 277/397 |

(Continued)

OTHER PUBLICATIONS

The Extended European Search Report for European Patent Application No. 19199522.4 dated Feb. 26, 2020.

*Primary Examiner* — Nicholas L Foster
(74) *Attorney, Agent, or Firm* — Carlson, Gaskey & Olds, P.C.

(57) ABSTRACT

A sealing arrangement for a shaft according to an example of the present disclosure includes a shaft and a sealing assembly. The sealing assembly includes a seal cartridge that has at least one sealing element. The first and second mating rings are configured to axially locate the seal cartridge with respect to the shaft. The second mating ring includes at least one tang that is configured to extend through at least one corresponding slot in the shaft, the at least one tang is configured to engage a retaining ring to axially retain the second mating ring on the shaft. A gearbox/accessory interface assembly and a method of sealing a gearbox with respect to an accessory are also disclosed.

20 Claims, 3 Drawing Sheets

(56) References Cited

U.S. PATENT DOCUMENTS

| | | | | |
|---|---|---|---|---|
| 5,630,699 | A * | 5/1997 | Kirby | F04D 29/126 |
| | | | | 277/361 |
| 6,446,975 | B1 * | 9/2002 | Bratthall | F16J 15/3404 |
| | | | | 277/366 |
| 6,729,622 | B2 * | 5/2004 | Vedsted | F16J 15/348 |
| | | | | 277/371 |
| 6,761,359 | B2 * | 7/2004 | Azibert | F16J 15/3404 |
| | | | | 277/370 |
| 8,128,096 | B2 * | 3/2012 | Svejkovsky | F16J 15/3464 |
| | | | | 277/372 |
| 8,302,971 | B2 * | 11/2012 | Huang | F04D 29/126 |
| | | | | 277/370 |
| 8,757,631 | B2 * | 6/2014 | Suefuji | F16J 15/3464 |
| | | | | 277/390 |
| 2002/0089123 | A1 * | 7/2002 | Azibert | F16J 15/3472 |
| | | | | 277/370 |
| 2002/0125648 | A1 | 9/2002 | Vedsted et al. | |
| 2010/0090412 | A1 * | 4/2010 | Scott | F04D 29/126 |
| | | | | 277/375 |
| 2011/0121514 | A1 * | 5/2011 | Eriksson | F16J 15/3464 |
| | | | | 277/306 |
| 2011/0298182 | A1 | 12/2011 | Huang | |

* cited by examiner

SHAFT FACE SEAL

BACKGROUND

This application relates generally to a double acting mechanical face seal, and in particular, to a mechanical face seal for an accessory gearbox for a gas turbine engine.

Gas turbine engines include gearboxes that use engine power to drive accessories, such as fuel pumps and the like. Like the engine itself, gearboxes utilize lubricant (oil). The gearbox and engine can be configured in a shared oil configuration, or with separate oil systems. Likewise, accessories that utilize oil can share oil with the gearbox or contain their own, separate lubrication system. When the accessory and gearbox oil systems are separate, rotating shaft seals are typically incorporated into the accessory and the gearbox to prevent migration of oil form one system into the other. These seals are most commonly located around the output shaft of the accessory and the input shaft of the gearbox.

SUMMARY

A sealing arrangement for a shaft according to an example of the present disclosure includes a shaft and a sealing assembly. The sealing assembly includes a seal cartridge that has at least one sealing element. The first and second mating rings are configured to axially locate the seal cartridge with respect to the shaft. The second mating ring includes at least one tang that is configured to extend through at least one corresponding slot in the shaft, the at least one tang is configured to engage a retaining ring to axially retain the second mating ring on the shaft.

In a further embodiment according to any of the foregoing embodiments, at least one tang extends inward from an inner diameter of the second mating ring.

In a further embodiment according to any of the foregoing embodiments, at least one tang includes two tangs and the at least one slot includes two slots.

In a further embodiment according to any of the foregoing embodiments, at least one tang and the at least one slot are generally rectangular.

In a further embodiment according to any of the foregoing embodiments, at least one slot is formed at an end face of the shaft such that a side of the slot is open for receiving the at least one tang in an axial direction.

In a further embodiment according to any of the foregoing embodiments, the retaining ring is arranged concentrically inside the shaft along an inner diameter of the shaft.

In a further embodiment according to any of the foregoing embodiments, the retaining ring is a spring-loaded snap ring.

In a further embodiment according to any of the foregoing embodiments, at least one sealing element is a carbon sealing element.

In a further embodiment according to any of the foregoing embodiments, at least one sealing element is self-lubricating.

A gearbox/accessory interface assembly according to an example of the present disclosure includes a gearbox having a gearbox shaft. An accessory has an accessory shaft, the accessory shaft is configured to receive torque from the gearbox shaft. A sealing assembly is configured to seal the gearbox with respect to the accessory. The sealing assembly includes a seal cartridge that has at least one sealing element. A first retaining ring is configured to retain the seal cartridge in the gearbox. The first and second mating rings are configured to axially locate the seal cartridge with respect to the gearbox shaft. The second mating ring includes at least one tang configured to extend through at least one corresponding slot in the gearbox shaft, the at least one tang is configured to engage a second retaining ring to axially retain the second mating ring on the shaft.

In a further embodiment according to any of the foregoing embodiments, the seal cartridge is stationary with respect to the gearbox shaft and the first and second mating rings rotate with the gearbox shaft.

In a further embodiment according to any of the foregoing embodiments, the first retaining ring is arranged concentrically around the gearbox shaft along an outer diameter of the gearbox shaft and the second retaining ring is arranged concentrically inside the gearbox shaft along an inner diameter of the gearbox shaft.

In a further embodiment according to any of the foregoing embodiments, at least one of the first and second retaining rings is a spring-loaded snap ring.

In a further embodiment according to any of the foregoing embodiments, a bearing is configured to facilitate rotation of the gearbox shaft. The first mating ring is retained with respect to the gearbox shaft by the bearing and the at least one sealing element.

In a further embodiment according to any of the foregoing embodiments, at least one tang extends inward from an inner diameter of the second mating ring.

In a further embodiment according to any of the foregoing embodiments, at least one tang includes two tangs and the at least one slot includes two slots.

In a further embodiment according to any of the foregoing embodiments, at least one tang and the at least one slot are generally rectangular.

In a further embodiment according to any of the foregoing embodiments, at least one slot is formed at an end face of the gearbox shaft such that a side of the slot is open for receiving the at least one tang in an axial direction.

A method of sealing a gearbox with respect to an accessory according to an example of the present disclosure includes fixing a seal cartridge in the gearbox with a retaining ring, the seal cartridge has at least one sealing element. The seal is axially located with respect to a gearbox shaft with first and second mating rings. The second mating ring includes at least one tang configured to extend through at least one corresponding slot in the gearbox shaft, the at least one tang is configured to engage a retaining ring to axially retain the second mating ring on the shaft.

In a further embodiment according to any of the foregoing embodiments, at least one slot is formed at an end face of the gearbox shaft, and the axially locating includes axially sliding the second mating ring onto the shaft such that the at least one tang slides into the at least one corresponding slot.

DETAILED DESCRIPTION

Gas turbine engines include gearboxes, which use engine power to drive accessories such as fuel pumps. A "dry pad"

gearbox/accessory interface is one in which a gearbox drives an accessory with power from an engine. The gearbox has a shaft which transmits torque to an accessory shaft. Both the gearbox and the accessory use lubricant (oil). A gearbox shaft sealing assembly and an accessory shaft sealing assembly prevent lubricant from the gearbox entering the accessory, and vice versa, to prevent contamination. For example, the gearbox and accessory may use different types of lubricant, and contamination interferes with the operation of the gearbox and/or accessory. In the dry pad arrangement, the sealing assemblies are designed and arranged such that no lubricant from either the gearbox or the accessory enters the dry pad. Accordingly, an operator or sensor monitors the dry pad for lubricant, which indicates a leak in one or both of the sealing assemblies.

A "wet pad" gearbox/accessory interface is one in which the gearbox and accessory share lubricant. Accordingly, there are no seals around the gearbox shaft and accessory shaft as in the "dry pad" discussed above. The accessory receives lubricant from a lubricant supply in the gearbox or to an external oil source. A drain drains lubricant from the accessory to the wet pad, which in turn drains lubricant to a sump or scavenge mechanism in the gearbox.

Figure 1A:
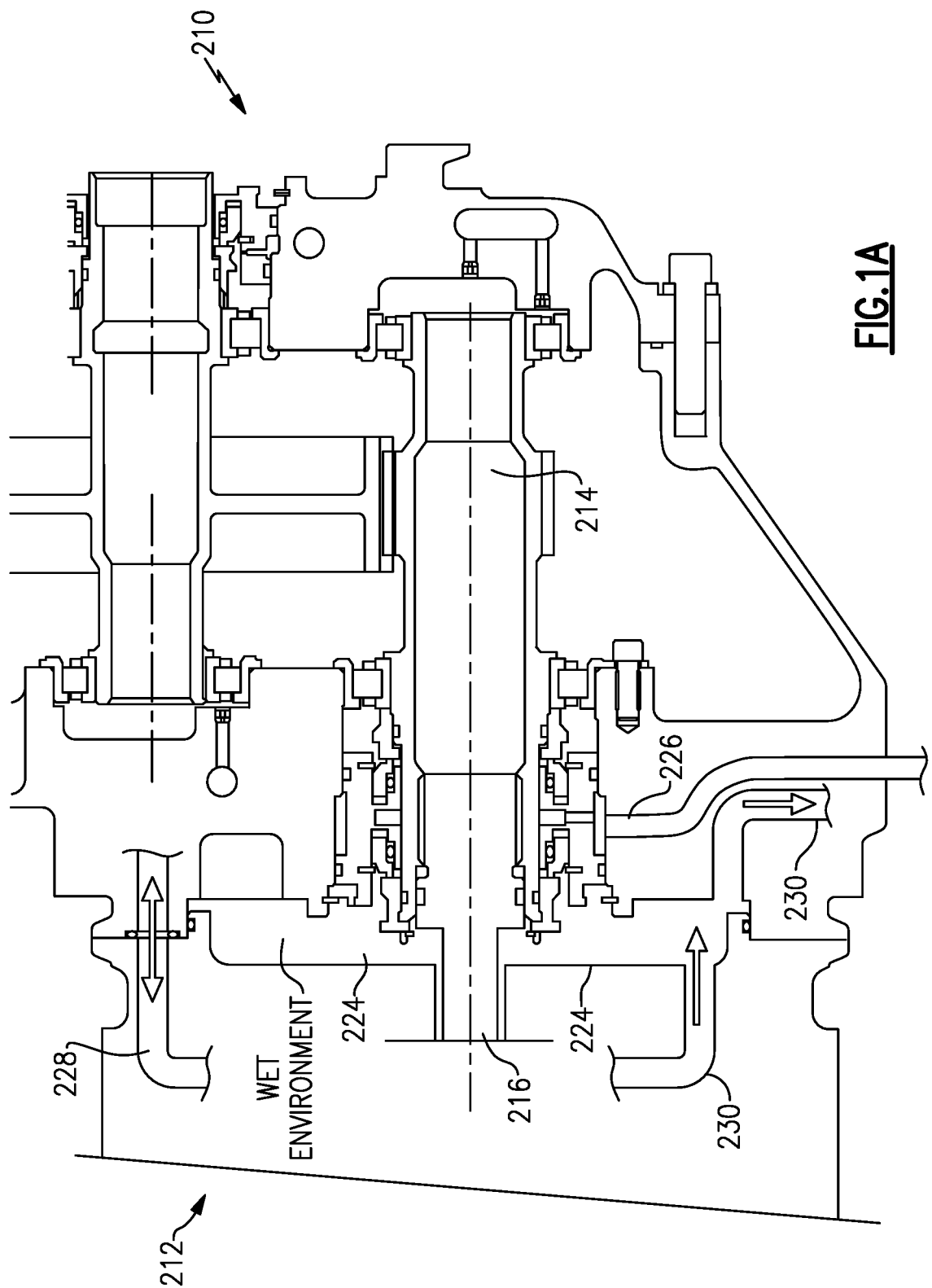
FIG. 1a schematically shows an example accessory/gearbox interface according to the present disclosure.
Figure 1B:
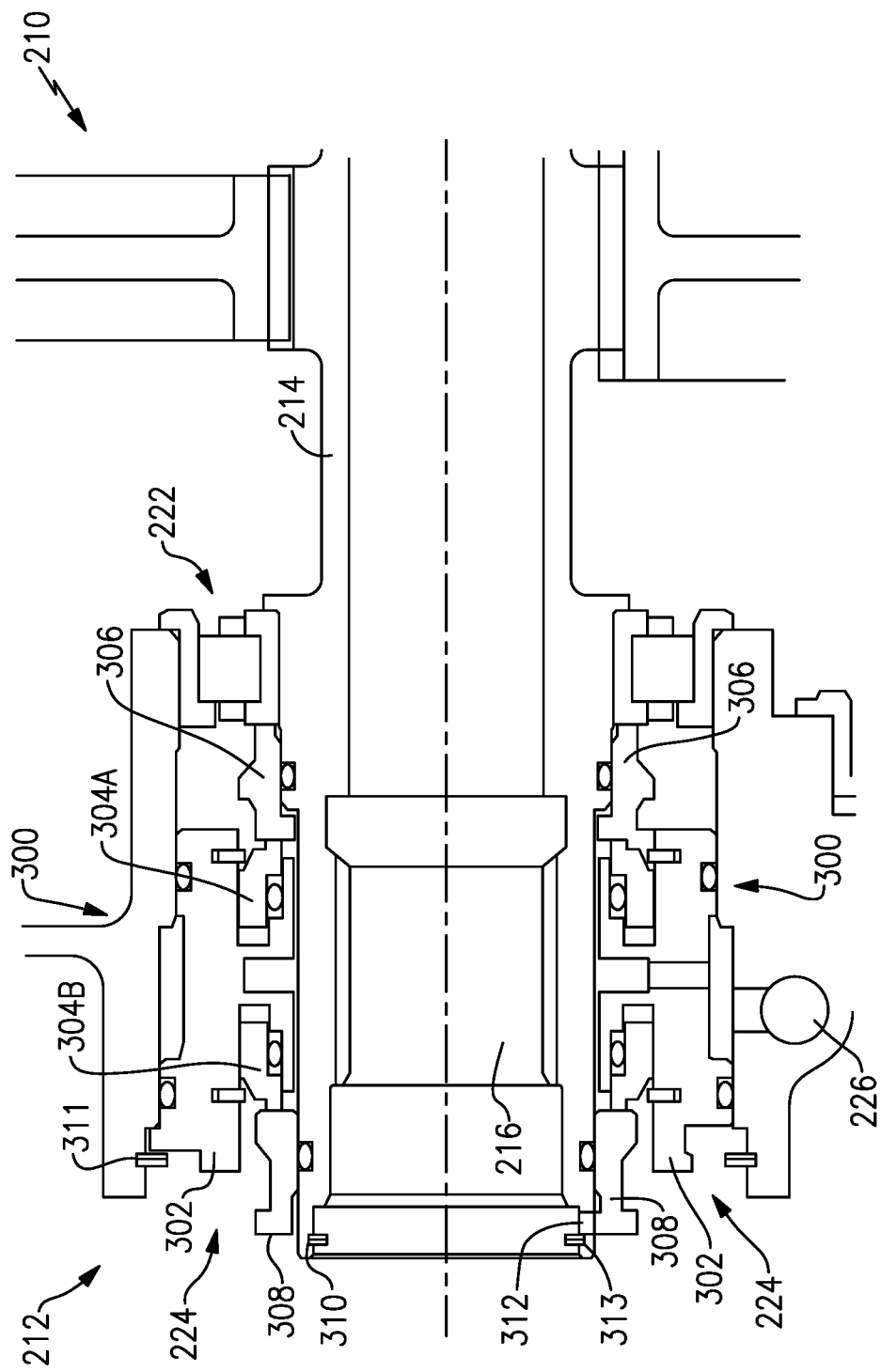
FIG. 1b schematically shows a detail view of the example accessory/gearbox interface according to the present disclosure.
Figure 1C:
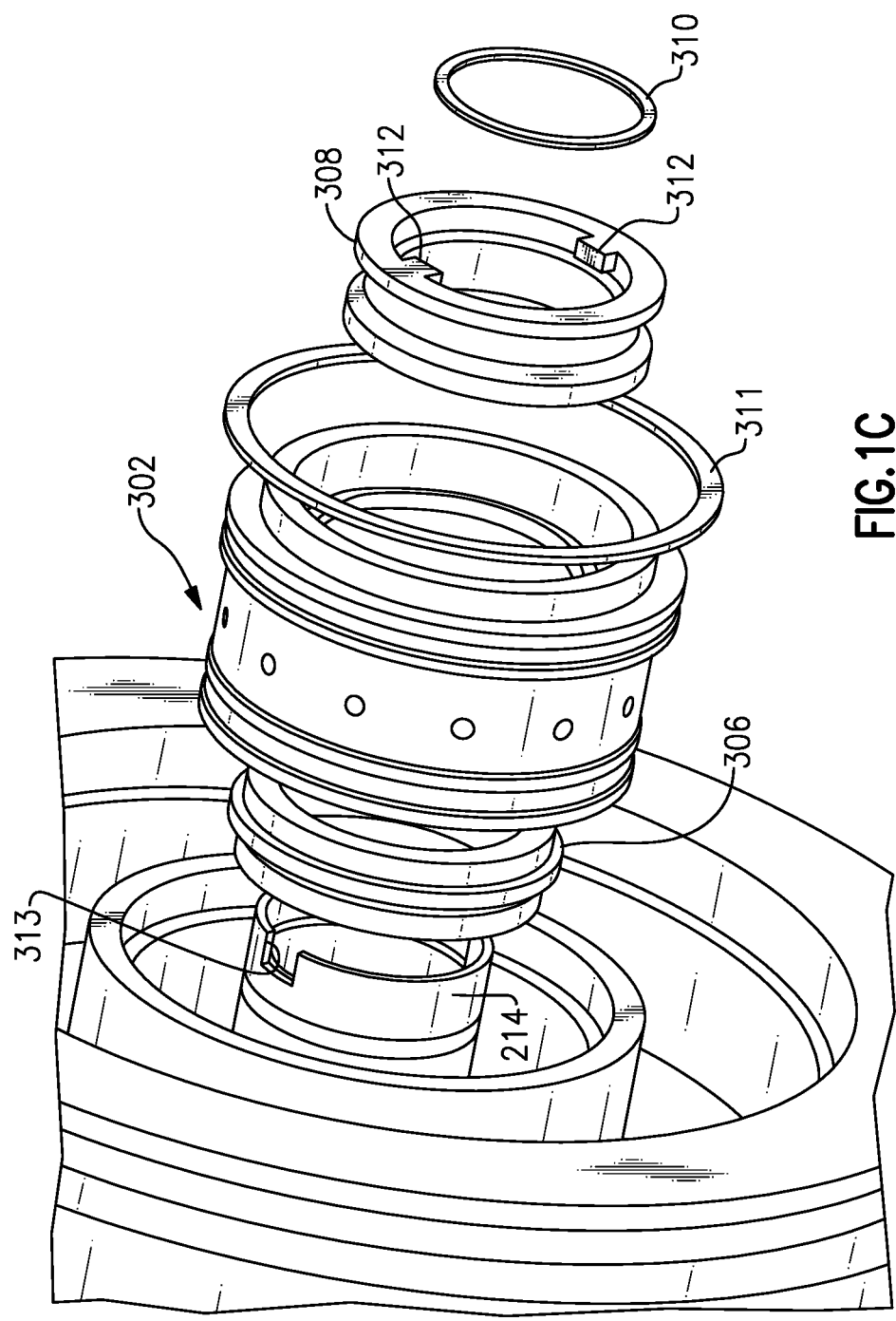
FIG. 1c schematically shows an exploded view of the example accessory/gearbox interface according to the present disclosure.

FIGS. 1a-c show an example gearbox/accessory interface. With reference to FIG. 1a, gearbox 210 includes a gearbox shaft 214 and accessory 212 includes an accessory shaft 216 which transfer power therebetween. This example has "wet" pad 224, but does not allow mixing of lubricant between the gearbox 210 and the accessory 212. Accordingly, an accessory 212 that is designed for a wet pad can interface with a gearbox 210 designed for a dry pad.

In particular, the accessory 212 receives lubricant from an inlet 228. Though the inlet 228 can pass through the gearbox 210, it is not in fluid communication with gearbox 210 lubricant. A drain 230 drains lubricant from the accessory 212. Again, though the drain 230 may pass through the gearbox 210, it is not in fluid communication with gearbox 210 lubricant. As stated, the fluid flowing to and from the accessory 212 is facilitated by an oil system separate from the gearbox 210 oil system, even though the gearbox 210 may include a conduit for the accessory 212 fluid flow that is not in fluid communication with the accessory 212 fluid.

A double acting seal assembly 300 is arranged on the gearbox shaft 214 adjacent the interface of the shafts 214, 216 to prevent mixing of lubricant between the gearbox 210 and accessory 212. As will become evident with the below description, the sealing assembly 300 is located in the gearbox 210 and is fixed to the gearbox 210.

The pad 224 includes a drain 226 which drains leakage from the double acting seal assembly 300 to a collector (not shown). The drain 226 output can be inspected periodically by an operator or sensor, for example, for fluid which indicates the presence of a leak in the double acting seal assembly 300. The drain 226 is generally arranged between first and second mating rings 306/308 (discussed below) and adjacent the seal cartridge 302.

Turning now to FIGS. 1b-c, a detail view of the seal assembly 300 is shown. The seal assembly 300 includes a fixed, non-rotating seal cartridge 302 which is axially retained in the gearbox 210 with a retaining ring 311. That is, the seal cartridge 302 does not rotate with the gearbox shaft 214, and is fixed in the gearbox 210 by the retaining ring 311. The retaining ring 311 is arranged concentrically around an outer diameter of the gearbox shaft 214.

The seal cartridge 302 includes first and second carbon elements 304a, 304b. The carbon elements 304a, 304b provide the sealing for the seal assembly 300. The carbon elements 304a, 304b can be made of any known carbon seal material. In one example, the carbon elements 304a, 304b are self-lubricating.

The seal assembly 300 also includes a first mating ring 306 and a second mating ring 308 axially locate the seal cartridge 302 with respect to the gearbox shaft 214. Both mating rings 306/308 are located on the gearbox shaft 214 (e.g., the mating rings 306/308 are arranged concentrically around the gearbox shaft 214). The mating rings 306/308 rotate with the gearbox shaft 214.

The gearbox mating ring 306 is axially retained with respect to the gearbox shaft 214 by the carbon element 304a and a bearing 222, which facilitates rotation of the gearbox shaft 214.

The second mating ring 308 is retained on the gearbox shaft 214 with a mating feature. The mating feature allows for axial retention of the mating ring 308 on the gearbox shaft 214 without a screw thread or clamp. Accordingly, the risk of distorting the mating ring 308 such that the sealing assembly 300 loses sealing effectiveness is minimized. Furthermore, the mating feature simplifies removal of the mating ring 308 from the gearbox shaft 214, for example, to enable on-wing maintenance of the gearbox 210/accessory 212 interface, including sealing assembly 300 replacement.

As shown in 1b-c, the mating feature includes a retaining ring 310 which is situated concentrically inside the gearbox shaft 214 on an internal diameter of gearbox shaft 214 and engages two tangs 312 on the mating ring 308 in order to axially retain the mating ring 308 with respect to the gearbox shaft 214. The tangs 312 are generally protrusions extending from an inner diameter of the second mating ring 308. To facilitate contact between the tangs 312 and the retaining ring 310, the tangs 312 extend through two slots 313 in gearbox shaft 214 (best seen in FIG. 1c). As best seen in FIG. 1b, the tangs 312 abut the retaining ring 310 to prevent the mating ring 308 axially towards the accessory 212.

In the example of FIGS. 1a-c, the second mating ring 308 includes two tangs 312 and the gearbox shaft 214 includes two corresponding slots 313. However, in other examples, more or less tangs/slots can be used. Furthermore, in the example of FIGS. 1a-c the slots 313 are formed at and end face of the gearbox shaft 214 such that one side of the slots 313 is open so that the tangs 312 can axially slide into the slots 313 when the mating ring 308 is slid onto the gearbox shaft 214. In particular, in this example, the slots 313 (and tangs 312) are generally rectangular. The slots 313 have an open side at an end fact of the gearbox shaft 214 and three other sides cut out from the gearbox shaft 214, as best seen in FIG. 1c. Though the example tangs 312/slots 313 are generally rectangular, other shapes are contemplated.

In the example of FIG. 1a-c, the retaining rings 310/311 are spring-loaded "snap rings" that mate to the gearbox shaft 214 by spring forces. However, in other examples, other types of retaining rings 310/311 are contemplated.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A sealing arrangement for a shaft, comprising:
   a shaft; and
   a sealing assembly, the sealing assembly including:
      a seal cartridge having at least one sealing element,
      first and second mating rings configured to axially locate the seal cartridge with respect to the shaft, wherein the second mating ring includes at least one tang extending through at least one corresponding slot in the shaft, the at least one tang engaging a retaining ring to axially retain the second mating ring on the shaft, wherein the retaining ring is arranged concentrically inside the shaft along an inner diameter of the shaft.

2. The sealing arrangement of claim 1, wherein the at least one tang extends inward from an inner diameter of the second mating ring.

3. The sealing arrangement of claim 2, wherein the at least one tang includes two tangs and the at least one slot includes two slots.

4. The sealing arrangement of claim 2, wherein the at least one tang and the at least one slot are generally rectangular.

5. The sealing arrangement of claim 2, wherein the at least one slot is formed at an end face of the shaft such that a side of the slot is open for receiving the at least one tang in an axial direction.

6. The sealing arrangement of claim 1, wherein the retaining ring is a spring-loaded snap ring.

7. The sealing arrangement of claim 1, wherein the at least one sealing element is a carbon sealing element.

8. The sealing arrangement of claim 7, wherein the at least one sealing element is self-lubricating.

9. The sealing arrangement of claim 1, wherein the at least one tang is integral with the second mating ring.

10. A gearbox and accessory interface assembly, comprising:
   a gearbox having a gearbox shaft;
   an accessory having an accessory shaft, the accessory shaft configured to receive torque from the gearbox shaft; and
   a sealing assembly configured to seal the gearbox with respect to the accessory, the sealing assembly including:
   a seal cartridge having at least one sealing element,
   a first retaining ring configured to retain the seal cartridge in the gearbox, and
   first and second mating rings configured to axially locate the seal cartridge with respect to the gearbox shaft, wherein the second mating ring includes at least one tang extending through at least one corresponding slot in the gearbox shaft, the at least one tang engaging a second retaining ring to axially retain the second mating ring on the shaft, wherein the retaining ring is arranged concentrically inside the gearbox shaft along an inner diameter of the gearbox shaft.

11. The gearbox and accessory interface assembly of claim 10, wherein the seal cartridge is stationary with respect to the gearbox shaft and the first and second mating rings rotate with the gearbox shaft.

12. The gearbox/accessory interface assembly of claim 10, wherein the first retaining ring is arranged concentrically around the gearbox shaft along an outer diameter of the gearbox shaft and the second retaining ring is arranged concentrically inside the gearbox shaft along an inner diameter of the gearbox shaft.

13. The gearbox and accessory interface assembly of claim 12, wherein at least one of the first and second retaining rings is a spring-loaded snap ring.

14. The gearbox and accessory interface assembly of claim 10, further comprising a bearing configured to facilitate rotation of the gearbox shaft, and wherein the first mating ring is retained with respect to the gearbox shaft by the bearing and the at least one sealing element.

15. The gearbox and accessory interface assembly of claim 10, wherein the at least one tang extends inward from an inner diameter of the second mating ring.

16. The gearbox and accessory interface assembly of claim 15, wherein the at least one tang includes two tangs and the at least one slot includes two slots.

17. The gearbox and accessory interface assembly of claim 15, wherein the at least one tang and the at least one slot are generally rectangular.

18. The gearbox and accessory interface assembly of claim 15, wherein the at least one slot is formed at an end face of the gearbox shaft such that a side of the slot is open for receiving the at least one tang in an axial direction.

19. A method of sealing a gearbox with respect to an accessory, comprising:
   fixing a seal cartridge in the gearbox with a retaining ring, the seal cartridge having at least one sealing element;
   axially locating the seal cartridge with respect to a gearbox shaft with first and second mating rings, wherein the second mating ring includes at least one tang extending through at least one corresponding slot in the gearbox shaft, the at least one tang engaging a retaining ring to axially retain the second mating ring on the shaft, wherein the retaining ring is arranged concentrically inside the gearbox shaft along an inner diameter of the gearbox shaft.

20. The method of claim 19, wherein the at least one slot is formed at an end face of the gearbox shaft, and wherein the axially locating includes axially sliding the second mating ring onto the shaft such that the at least one tang slides into the at least one corresponding slot.

* * * * *